United States Patent [19]
Blondé

[11] Patent Number: 5,982,417
[45] Date of Patent: Nov. 9, 1999

[54] DEVICE FOR DISPLAYING 3D IMAGES

[75] Inventor: Laurent Blondé, Thorigné-Fouillard, France

[73] Assignee: Deutsche Thomson-Brandt GmbH, Villingen-Schwenningen, Germany

[21] Appl. No.: 08/946,981

[22] Filed: Oct. 8, 1997

[30] Foreign Application Priority Data

Oct. 31, 1996 [FR] France .................................. 96 13364

[51] Int. Cl.$^6$ .................................................. H04N 13/04
[52] U.S. Cl. ................................................. 348/58; 348/43
[58] Field of Search ................................ 348/42, 43, 51, 348/58

[56] References Cited

U.S. PATENT DOCUMENTS 5,179,441  1/1993  Anderson .................................. 348/43
5,629,798  5/1997  Gaudreau ................................... 348/58
5,875,055  2/1999  Morishima ................................. 348/58

FOREIGN PATENT DOCUMENTS 0 672 936 A2  9/1995  European Pat. Off. .

*Primary Examiner*—Howard Britton
*Attorney, Agent, or Firm*—Joseph S. Tripoli; Frederick A. Wein; Joseph J. Kolodka

[57] ABSTRACT

The present invention relates to a device for displaying a sequence of 3D images on the basis of a first sequence of source images corresponding to the left eye and of a second sequence of source images corresponding to the right eye of an observer, said source images being conveyed respectively by a video signal $S_1$ and by a video signal $S_2$ of respective luminous intensities $E_1$ and $E_2$. The device includes a first means of calculation (6) intended to generate from said video signals $S_1$ and $S_2$ a luminous signal $S$ having an overall luminous intensity $E$ calculated as a function of the luminous intensities $E_1$ and $E_2$, said means of calculation (6) co-operating with a second means of calculation (8) in such a way as to split, for each pixel, the overall luminous energy $E$ in proportion to the luminous intensities $E_1$ and $E_2$.

10 Claims, 1 Drawing Sheet

DEVICE FOR DISPLAYING 3D IMAGES

BACKGROUND OF THE INVENTION a. Field of the Invention

The present invention relates to a device for displaying a sequence of 3D images on the basis of a first sequence of source images corresponding to the left eye and of a second sequence of source images corresponding to the right eye of an observer, said source images being conveyed respectively by a video signal $S_1$ and by a video signal $S_2$ of respective luminous intensities $E_1$ and $E_2$ and either emanate from reception and/or decoding units which split the light along a first analysis path for light corresponding to the left eye and along a second analysis path corresponding to the right eye of the observer, or are produced in a manner known per se by electronic means of image synthesis.

b. Description of the Prior Art

The 3D display or stereoscopic display of images usually consists in viewing on one and the same device a series of images corresponding to the right eye and a series of images corresponding to the left eye of an observer. These two video sequences are in general captured or generated in such a way as to make it possible to comply with the geometry of human vision so that the offsets between the left view and the right view of the observer are reconstructed correctly by the psychovisual process which allows stereoscopic vision.

Among the known solutions for generating a luminous signal compatible with stereoscopic vision, the double-display or double-projection devices display the two video sequences simultaneously. The two paths are combined by polarizing one of these two paths in a first specified direction and by polarizing the other path in a second direction direction. Separation of the two paths, at the observer, is achieved by appropriate polarizing glasses. These devices have the drawback, however, of duplicating the number of image generator devices which may be, for example, television type monitors stationed symmetrically on each side of a semi-reflecting plate, so that the screens appear merged from the viewpoint of the observer. In this case, it is necessary to station a polarizing filter in front of each screen so as to create the desired polarization orientation. The image generator devices may also consist of two video projectors. In this case, it is necessary to fit out each beam with an appropriate polarizing filter. Furthermore, projection must be carried out onto a special screen so as to preserve the orientation of the polarization. This considerably raises the complexity and cost of such devices.

Other known solutions use either time-sequencing devices or spatial-interlacing devices. In the first case, the images are time-division multiplexed for example, by interlacing, on one and the same signal and at video rate, video signals corresponding respectively to the right eye and left eye of the observer. Said paths are separated in general by special glasses which block off the right eye and the left eye alternately and in synchronism with the interlacing. In a manner known per se, the blocking off of a path is achieved by stationing a liquid crystal cell between a polarizer and an analyser. The rotation (by 90°) or non-rotation of the polarization by the liquid crystal makes it possible to render the glass passing or blocking at the desired rate. A major drawback of this type of device stems from the fact that the apparent frequency of display (for each eye) is halved as compared with non-stereoscopic display.

As far as the spatial-interlacing devices are concerned, they consist of micropolarizing halftone filters enabling each R, G or B sub-pixel of an image to be assigned an identified polarization direction. Multiplexing the signals $S_1$ and $S_2$ in tandem with the polarization frame makes it possible to generate a suitable luminous signal. In these types of device, the apparent spatial resolution (for each eye) is halved as compared with non-stereoscopic display.

The purpose of the invention is to alleviate the drawbacks of the prior art devices by means of a compact device which makes it possible to preserve the frequency of display and the resolution of the images to be displayed at least at the same level as those achieved by non-stereoscopic devices.

SUMMARY OF THE INVENTION

The display device according to the invention includes a first means of calculation intended to generate from said video signals $S_1$ and $S_2$ a video signal S having an overall luminous intensity E calculated as a function of the luminous intensities $E_1$ and $E_2$, said first means of calculation co-operating with a second means of calculation in such a way as to split, for each pixel, the overall luminous intensity E in proportion to the luminous intensities $E_1$ and $E_2$.

The display of 3D images is carried out according to a process which includes the following steps:

for each pixel of the image to be displayed, a video signal S having an overall luminous intensity E calculated as a function of the luminous intensities $E_1$ and $E_2$ is generated from the video signals $S_1$ and $S_2$, and then said overall luminous intensity E is split over each analysis path in proportion to the luminous intensities $E_1$ and $E_2$.

Thanks to the device and the process in accordance with the invention, the frequency of display and the apparent spatial resolution of the image are kept identical to those of the video signals representing the source images. Furthermore, with the device of the invention, it is no longer necessary to duplicate the image-generating source. This makes it possible appreciably to simplify the structure of the device for displaying images in 3D, and hence to reduce the cost of their manufacture.

BRIEF DESCRIPTION OF THE DRAWINGS

Other characteristics and advantages of the invention will emerge from the description which follows, taken by way of non-limiting example with reference to the appended figure diagrammatically representing a device for generating 3D images in accordance with the invention.

DETAILED DESCRIPTION OF THE INVENTION

Figure 1:
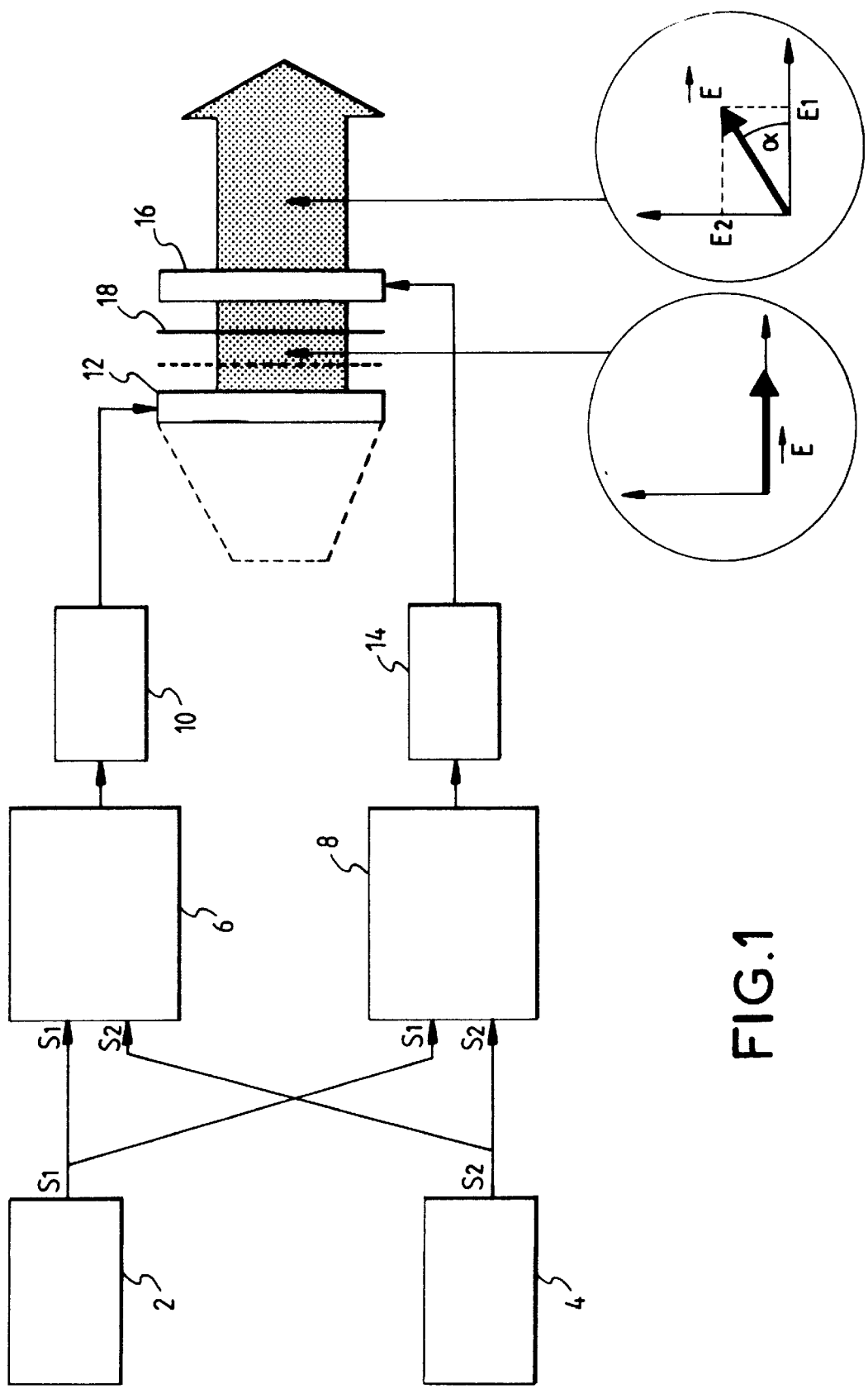

The device of FIG. 1 represents a device for displaying a sequence of 3D images on the basis of a first sequence of source images corresponding to the left eye and of a second sequence of source images corresponding to the right eye of an observer. These source images are conveyed respectively by a video signal $S_1$ and by a video signal $S_2$ of respective luminous intensities $E_1$ and $E_2$ and are delivered, for example, by reception/decoding units 2 and 4.

As may be seen in FIG. 1, each of the reception/decoding units 2 and 4 is linked, on the one hand, to a first means of calculation 6 and, on the other hand, to a second means of calculation 8. The output of the first means of calculation 6 is linked to the input of a first module for correcting non-linearities 10, the output of which is linked to a viewing unit 12, whilst the output of the second means of calculation 8 is linked to the input of a second module for correcting non-linearities 14, the output of which is linked to a polarization orientation element 16.

The first means of calculation 6 is intended to generate a luminous signal S having an overall luminous intensity proportional to the quadratic sum of the luminous intensities $E_1$ and $E_2$. This signal S drives the viewing unit 12 which is mounted in cascade with the polarization orientation unit 16. This polarization orientation unit 16 is controlled by signals generated by the second means of calculation 8 in such a way as to split, for each pixel, the luminous intensity transmitted by the viewing unit 12, in proportion to the luminous intensities $E_1$ and $E_2$, over a first analysis path corresponding to the left eye and over a second analysis path corresponding to the right eye of the observer. A conjugation element 18, intended to optimize the luminous flow exiting from the viewing unit 12, can be inserted between this viewing unit 12 and the polarization orientation unit 16.

According to a preferred embodiment of the invention, the viewing unit 12 consists of a polarized emissive element such as, for example, a first LCD screen, whilst the polarization orientation unit 16 consists of a second LCD screen. This second LCD screen is of the twisted nematic type and possesses a geometry identical to that of the first LCD screen 12. Furthermore, the second LCD screen 16 is controlled in such a way as to effect a suitable polarization orientation for each pixel or sub-pixel of the image. We note, however, that it is possible to use, by way of polarized emissive element, a polarized television tube, a tube or a projector valve. Moreover, in order that the transmitted luminous signal should retain its polarization during its propagation, the element for orienting the polarization does not include any analyser at exit.

As was stated above, the images conveyed by the signals $S_1$ and $S_2$ are either received from a transmitter or are synthesized by an electronic device for image synthesis. In both cases, the signals $S_1$ and $S_2$ are provided simultaneously, on the one hand, to the first means of calculation 6 and, on the other hand, to the second means of calculation 8. If the overall electric field required in order to display a pixel P is represented by the vector $\vec{E}$, and the luminous electric fields corresponding to the video signals $S_1$ and $S_2$ are represented respectively by the vectors $E_1$ and $E_2$, said overall field can be expressed through the vector relation:

$$\vec{E} = \vec{E}_1 + \vec{E}_2$$

The first means of calculation 6 makes it possible to calculate the intensity of this overall electric field given by the expression:

$$E = k\sqrt{E_1^2 + E_2^2}$$

where k is a coefficient of proportionality.

Whilst the second means of calculation makes it possible to calculate the angle $$\alpha = k'\operatorname{Arctan}\left(\frac{E_1}{E_2}\right)$$

where k' is a coefficient of proportionality. The angle $\alpha$ represents the orientation of the electric field $\vec{E}$ required in order to split the intensity E over each of the analysis paths so that the energy perceived on the first path is proportional to the intensity $E_1$ and that the energy perceived on the second path is proportional to the intensity $E_2$.

Thus, thanks to the device according to the invention, for each pixel, the orientation of the polarization of the light is set as a function of the luminous intensities $E_1$ and $E_2$.

The invention applies to the television domain and more specifically to any stereoscopic display device which uses the polarization of the video signals to separate the first and the second analysis path for the light emanating from a screen.

What is claimed is:

1. Device for displaying a sequence of 3D images on the basis of a first sequence of source images corresponding to the left eye and a second sequence of source images corresponding to the right eye of an observer, said source images being conveyed respectively by a video signal $S_1$ and by a video signal $S_2$ of respective luminous intensities $E_1$ and $E_2$, characterized in that it includes a first means of calculation intended to generate from said video signals $S_1$ and $S_2$ a video signal S having an overall luminous intensity E calculated as a function of the luminous intensities $E_1$ and $E_2$, said means of calculation co-operating with a second means of calculation in such a way as to split, for each pixel, the overall luminous intensity E in proportion to the luminous intensities $E_1$ and $E_2$.

2. Device according to claim 1, characterized in that it includes a viewing unit mounted in cascade with a polarization orientation element, said viewing unit being driven by the signal S, whilst the polarization orientation element is controlled by signals generated by the second means of calculation.

3. Device according to claim 2, characterized in that the viewing unit consists of a polarized emissive element.

4. Device according to claim 3, characterized in that the polarized emissive element is a first LCD screen.

5. Device according to claim 2, characterized in that the polarization orientation unit consists of a second LCD screen of twisted nematic type.

6. Device according to claim 1, characterized in that it includes a conjugation element disposed between the first LCD screen and the second LCD screen and intended to optimize the luminous flow exiting from said first LCD screen.

7. Process for generating 3D images from a first sequence of source images intended for a first analysis path for light corresponding to the left eye and from a second sequence of source images intended for a second analysis path corresponding to the right eye of an observer, said source images being conveyed respectively by a video signal $S_1$ and by a video signal $S_2$ of respective luminous intensities $E_1$ and $E_2$, characterized in that, for each pixel, a video signal S having an overall luminous intensity E calculated as a function of the luminous intensities $E_1$ and $E_2$ is generated from the video signals $S_1$ and $S_2$, and then said overall luminous intensity E is split over each analysis path in proportion to the luminous intensities $E_1$ and $E_2$.

8. Process according to claim 7, characterized in that the overall luminous intensity E is calculated by forming the quadratic sum $$E = k\sqrt{E_1^2 + E_2^2}$$

where k is a coefficient of proportionality, and a viewing unit is then controlled on the basis of the overall luminous intensity E calculated.

9. Process according to claim 7, characterized in that said overall luminous intensity E is split over each analysis path by modifying the polarization angle of the luminous signal S.

10. Process according to claim 9, characterized in that the polarization of the signal S is modified by calculating, for each signal S generated, the angle $$\alpha = k' \text{Arctan}\left(\frac{E_1}{E_2}\right)$$

where k' is a coefficient of proportionality, and a polarization orientation element is then controlled on the basis of the angle $\alpha$ calculated.

* * * * *